United States Patent Office 3,060,219
Patented Oct. 23, 1962

3,060,219
PRODUCTION OF METHYL BORATE
Henry S. Uchida, Mars, and Thomas B. Williams, Zelienople, Pa., assignors to Callery Chemical Company, Pittsburgh, Pa., a corporation of Pennsylvania
No Drawing. Filed Apr. 14, 1960, Ser. No. 22,131
3 Claims. (Cl. 260—462)

This invention relates to a method by which methyl borate, $B(OCH_3)_3$, is simultaneously recovered from its admixtures with methanol and produced from trimethoxyboroxine.

Methyl borate is a basic boron chemical. Processes by which it is prepared, for example, from boric acid and methanol, result in a constant boiling mixture consisting of about a 1 to 1 molar ratio of methyl borate and methanol, i.e. a methyl borate-methanol azeotrope. Other mixtures of methyl borate and methanol, having various compositions, are obtained as by-products from certain processes wherein methyl borate is used as a reactant. Trimethoxyborozine, $B_3O_3(OCH_3)_3$, is obtained in large quantities as a by-product of certain processes wherein other boron compounds are produced. The boron values in this compound must be recovered in order to make such processes commercially feasible. While several methods of recovering methyl borate from mixtures with methanol have been studied heretofore, see, for example, the methods described in Schlesinger et al. in Journal of the American Chemical Society, 75, 213 (1953), there are no methods which have been proposed for recovery of methyl borate from such mixtures that can be used to produce methyl borate or other boron compounds from trimethoxyboroxine at the same time.

It is, therefore, the broad object of the present invention to provide a method whereby methyl borate is both recovered from methyl borate-methanol mixtures and produced from trimethoxyboroxine, and to provide such a method which is novel, economical, and applicable to continuous operation. Other, more particularized, objects will appear from the following description of the invention and its embodiments.

Our invention in its broad aspects comprises the reaction of a methyl borate-methanol mixture with trimethoxyboroxine. Boric acid is precipitated during the reaction and is then removed; the resulting mixture is then distilled, thereby producing methyl borate. Using the azeotropic mixture as an example, the reaction which takes place is as follows:

(1) 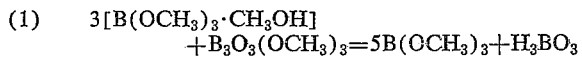
$$3[B(OCH_3)_3 \cdot CH_3OH] + B_3O_3(OCH_3)_3 = 5B(OCH_3)_3 + H_3BO_3$$

In practice, since the above reaction is reversible and there are present various equilibria between the several reactants, intermediates and products, the above reaction does not go to completion. We have found that if the ratio of reactants is controlled, the removal of the precipitated boric acid from the site of the reaction drives Equation 1 to the right sufficiently so as to make the process practical and advantageous. The ratio of reactants required to precipitate boric acid and therefore to cause the reaction to proceed efficiently depends upon several factors. Thus, the proportions of methanol and methyl borate in the starting mixture and the temperature at which the process is carried out affect the optimum amount of trimethoxyboroxine to be used. However, we have found that, in general, about one mol of trimethoxyboroxine for each one to six mols of methyl borate present are required, and that about one mol for each three mols of methyl borate are to be preferred. These ratios are particularly efficacious when the starting mixture has the composition of the normal methyl borate-methanol azeotrope, i.e., about a 1 to 1 molar proportion of methyl borate and methanol.

The reaction mixture after the removal of the boric acid contains methyl borate, some methanol and trimethoxyboroxine, and a small amount of dissolved boric acid. This mixture upon distillation first produces methyl borate-methanol azeotrope until the methanol and any boric acid present in the mixture are exhausted, and then pure methyl borate is obtained. If sufficiently high reflux ratios are not used, the overhead product is not separated into azeotrope and methyl borate; in such instances, a mixture of methyl borate and methanol containing an increased proportion of methyl borate is obtained. Thus, at high reflux ratios, for example about 60 to 1, first the azeotrope and then pure methyl borate are recovered, and at relatively low reflux ratios, for example about 15 to 1, a methyl borate-methanol mixture richer in methyl borate than is the azeotrope is obtained.

The temperature at which the methyl borate-methanol mixture and the trimethoxyboroxine are reacted does not affect operability. Ambient temperatures, i.e. about 25° C., can be used and are convenient, but because a slight rise in temperature results when the reactants are mixed it is preferred to cool the reaction body slightly so as to maintain the temperature between about 0° C. and 20° C. While moderately elevated temperatures do not render the process inoperative, at such temperatures the solubility of boric acid in the mixture is increased and the efficiency of the process is decreased, so that elevated temperatures are preferably avoided.

Most desirably, the reaction is carried out until the maximum amount of boric acid is precipitated. The time required for complete precipitation varies with the temperature, the amount of methanol and methyl borate present, and the ratio of trimethoxyboroxine to methanol used. For example, within the limits described above increased relative amounts of trimethoxyboroxine result in faster reaction and precipitation. About one hour is sufficient in most instances.

After the reaction has proceeded for the desired time, the boric acid is removed from the reaction mixture. This is accomplished most generally by filtration, although other conventional methods, such as centrifugation or decantation, can also be used if desired. The reaction mixture, freed of solid boric acid, is then distilled. As discussed above, methyl borate-methanol azeotrope and either pure methyl borate or methyl borate-methanol mixtures enriched in methyl borate are recovered. The composition of the distillation pot bottoms depends upon the extent to which the distillation is carried. Generally the distillation is carried out until the residual liquid is comprised mainly of trimethoxyboroxine, which is then recycled. If the distillation is carried further, the heat load is excessive and a glassy residue which is difficult to remove results. The extent of distillation is conveniently controlled by monitoring the pot temperature. An easily handled residue comprised of trimethoxyboroxine is recovered in the pot bottoms when the distillation is run until the pot temperature reaches about 150° C.

To exemplify the practice of our invention, in one operation thereof a mixture comprised of 279 mols of methyl borate and 256 mols of methanol was reacted with 82.8 mols of trimethoxyboroxine. The reaction mixture rose slightly in temperature from the initial temperature of 20° C. and was then cooled slightly. After the reaction had proceeded for about one hour, 26.5 mols of boric acid had precipitated and were removed by filtration. The reaction mixture was then distilled. A mixture of methyl borate-methanol azeotrope and methyl borate, consisting of 279 mols of methyl borate and 170 mols of methanol, was recovered from distillation at a partial reflux ratio of 15 to 1. The distillation was continued at a reflux ratio of 60 to 1 and 52 mols of pure methyl borate were then obtained. At this point the pot temperature had reached 150° C. and the distillation was terminated. The residual liquid had approximately the same analysis as the original trimethoxyboroxine, and was recycled for reuse in the process.

We have further found that more complete reaction and greater production of methyl borate is achieved by carrying out the reaction of a methyl borate-methanol mixture and trimethoxyboroxine in the presence of mineral oil as the reaction medium. Furthermore, the ratio of trimethoxyboroxine to methanol is not critical when mineral oil is used, although it is preferred for greater efficiency to use about stoichiometric quantities according to Equation 1 above. The use of mineral oil has differing effects, depending upon the relative amounts of methanol present. In general, the mineral oil acts as a solvent for the methyl borate and decreases the solubility of the boric acid in the methyl borate present, thereby resulting in the precipitation and removal of more boric acid. Whenever the starting mixture of methyl borate and methanol is of about the composition of the normal azeotrope, approximating a 1 to 1 molar ratio, the addition of mineral oil to the reaction mixture results in two phases, a liquid phase containing mineral oil, methyl borate and unreacted methanol, and a solid phase composed of substantially all the boric acid formed. The solid boric acid is then filtered out and the liquid phase is distilled as in the embodiment above. An additional advantage which has been found to accrue from the use of mineral oil in this manner is that the boric acid is more easily filterable and is of very high purity.

The increased efficiency of this embodiment of the invention was demonstrated in a test in which a mixture comprised of 273.5 mols of methyl borate and 281.6 mols of methanol was reacted with 89.1 mols of trimethoxyboroxine in the presence of about an equal volume of mineral oil at 20° C. The reaction produced 63.6 mols of precipitated boric acid which were removed by filtration. Analysis showed the boric acid recovered to be 99.7% pure. The reaction mixture was then distilled and 256.6 mols of methyl borate were obtained, along with 93.7 mols of the methanol-methyl borate azeotrope. The distillation was terminated when the pot temperature reached 250° C., at which point the pot bottoms consisted of mineral oil, trimethoxyboroxine and some methyl borate. On cooling the pot bottoms, a glassy solid formed.

The use of mineral oil in the reaction of trimethoxyboroxine with a methyl borate-methanol mixture containing a relatively large amount of methanol, i.e., substantially more than one mol of methanol for each mol of methyl borate, results in a system containing three phases—two liquid layers and solid boric acid. One liquid layer contains mineral oil, methyl borate and some methanol, and the other liquid phase contains mainly methanol, some methyl borate, and dissolved boric acid. The surprising feature of this embodiment is that, while normally the methanol layer is lighter than the mineral oil-methyl borate layer, in the presence of boric acid, the mineral oil-methyl borate layer is lighter and the methanol-boric acid layer is heavier. This permits the mineral oil-methyl borate layer to be decanted from the methanol and the boric acid, including the solid boric acid which settles in the methanol layer, thereby avoiding the necessity for filtering the boric acid at this point. The methanol-boric acid mixture can be used without further treatment to produce methyl borate-methanol azeotrope. There are several other advantages to carrying out the process in this manner, particularly in operation on a large scale. For example, capital equipment needs are reduced because the filtering step is eliminated and because the distillation of the mineral oil-methyl borate layer is comparatively easy in the absence of boric acid. Another advantage is that the excess methanol appears to help drive the reaction toward the desired products. These advantages are at times sufficient to make it desirable to recover methyl borate from the azeotrope by adding additional methanol to the azeotrope in order to carry out the process in this manner, although such a course is contrary to ordinary practice in that additional quantities of an undesirable impurity are thereby added.

In one demonstration of this embodiment of the invention, a methyl borate-methanol mixture composed of 148.3 g. of methyl borate and 57.7 g. of methanol was added to 104.4 g. of additional methanol. This methanol rich mixture was reacted with 104.1 g. of trimethoxyboroxine in 829.5 g. of mineral oil. Two liquid layers formed; the top layer, containing 792.1 g. of mineral oil, 313.2 g. of methyl borate, 31.1 g. of methanol and a small amount of trimethoxyboroxine, was decanted and flash distilled to a pot temperature of 250° C. The overhead product from the flash distillation was composed of 259.6 g. of methyl borate and 31.1 g. of methanol; this product was distilled and produced 126.0 g. of methyl borate-methanol azeotrope, which was stored for reuse, and 164.7 g. of pure methyl borate as the final product. The pot bottoms from the flash distillation, composed of 792 g. of mineral oil with some trimethoxyboroxine and methyl borate, were suitable for reuse in the initial step of the process, while the lower layer of the reaction mixture, containing 76.4 g. of methanol, 36.8 g. of boric acid, and 12.5 g. of mineral oil, can be used to produce methyl borate - methanol azeotrope by well known methods.

In other tests and demonstrations of our invention, the temperature of mixing and the ratio of the reactants were varied, and the effect of mineral oil was confirmed. In all cases production of methyl borate from the trimethoxyboroxine and separation of the methyl borate-methanol mixtures were effected.

According to the provisions of the patent statutes, we have explained the principle and mode of practicing our invention and have described what we now consider to be its best embodiments. However, we desire to have it understood that, within the scope of the appended claims, the invention may be practiced otherwise than as specifically described.

We claim:

1. A method of recovering methyl borate which comprises reacting trimethoxyboroxine with methyl borate-methanol azeotrope in the presence of mineral oil as the reaction medium, filtering the precipitated boric acid, and distilling the filtrate.

2. A method in accordance with claim 1 in which about 1 mol of trimethoxyboroxine is used for each mol of azeotrope.

3. A method of recovering methyl borate which comprises reacting trimethoxyboroxine with a methyl borate-methanol mixture having substantially more than one mol of methanol for each mol of methyl borate, said reaction being carried out in the presence of mineral oil as the reaction medium whereby two liquid layers are formed, and separating and distilling the top layer.

References Cited in the file of this patent

UNITED STATES PATENTS 2,802,018    Ton    Aug. 6, 1957

OTHER REFERENCES

Webster et al., J. Amer. Chem. Soc. vol. 55, pp. 3233–5 (1933).

Lappert, J. Chem. Soc. (London), pp. 3256 (1958).